US009210734B2

(12) United States Patent
Hsu et al.

(10) Patent No.: US 9,210,734 B2
(45) Date of Patent: Dec. 8, 2015

(54) DIRECT MODE COMMUNICATION SYSTEM AND COMMUNICATION ATTACHING METHOD THEREOF

(71) Applicant: Institute For Information Industry, Taipei (TW)

(72) Inventors: Hsien-Tsung Hsu, Taipei (TW); Yi-Hsueh Tsai, New Taipei (TW); Kanchei Loa, Taipei (TW); Yi-Ting Lin, New Taipei (TW)

(73) Assignee: Institute For Information Industry, Taipei (TW)

( * ) Notice: Subject to any disclaimer, the term of this patent is extended or adjusted under 35 U.S.C. 154(b) by 211 days.

(21) Appl. No.: 13/886,169

(22) Filed: May 2, 2013

(65) Prior Publication Data

US 2013/0294433 A1 Nov. 7, 2013

Related U.S. Application Data

(60) Provisional application No. 61/642,466, filed on May 4, 2012, provisional application No. 61/672,785, filed on Jul. 18, 2012, provisional application No. 61/721,020, filed on Oct. 31, 2012.

(51) Int. Cl.
  *H04W 76/02* (2009.01)
  *H04W 84/12* (2009.01)
  *H04W 4/02* (2009.01)
  *H04W 64/00* (2009.01)

(52) U.S. Cl.
  CPC .............. *H04W 76/023* (2013.01); *H04W 4/02* (2013.01); *H04W 64/00* (2013.01); *H04W 84/12* (2013.01)

(58) Field of Classification Search
  None
  See application file for complete search history.

(56) References Cited

U.S. PATENT DOCUMENTS

| 2006/0034317 | A1* | 2/2006 | Hong et al. | 370/445 |
| 2009/0285119 | A1 | 11/2009 | Horn et al. | |
| 2010/0008312 | A1 | 1/2010 | Viswanath | |
| 2010/0254308 | A1 | 10/2010 | Laroia et al. | |
| 2013/0102314 | A1* | 4/2013 | Koskela et al. | 455/436 |
| 2013/0287012 | A1* | 10/2013 | Pragada et al. | 370/338 |

* cited by examiner

*Primary Examiner* — Ayaz Sheikh
*Assistant Examiner* — Tarell Hampton
(74) *Attorney, Agent, or Firm* — Skaar Ulbrich Macari, P.A.

(57) ABSTRACT

A direct-mode communication system includes a first client direct-mode communication apparatus and a first backhaul network. The first client direct-mode communication apparatus transmits a proximity notification request to a second backhaul network via the first backhaul network so that the second backhaul network returns a proximity notification acknowledgement (ACK) signal. The first backhaul network receives a piece of first client location information and a piece of second client location information from the first direct-mode communication apparatus and the second backhaul network respectively, and determines a location relationship accordingly. The first backhaul network transmits a Wi-Fi connection signal to the first client direct-mode communication apparatus according to the location relationship. The first client direct-mode communication apparatus establishes a direct-mode communication connection with a second client direct-mode communication apparatus according to the Wi-Fi connection signal.

20 Claims, 6 Drawing Sheets

DIRECT MODE COMMUNICATION SYSTEM AND COMMUNICATION ATTACHING METHOD THEREOF

PRIORITY

This application claims the benefit of U.S. Provisional Application Ser. No. 61/642,466 filed on May 4, 2012, U.S. Provisional Application Ser. No. 61/672,785 filed on Jul. 18, 2012, and U.S. Provisional Application Ser. No. 61/721,020 filed on Oct. 31, 2012, each of which is hereby incorporated by reference herein in its entirety.

FIELD

The present invention relates to a direct-mode communication system and a communication attaching method thereof; and more particularly, the direct-mode communication system and the communication attaching method thereof according to the present invention allow direct-mode communication apparatuses connected with different backhaul networks to create direct-mode communication connections therebetween.

BACKGROUND

Apparatuses in a conventional direct-mode communication system can communicate with each other directly. This allows message exchange therebetween to be accomplished more simply and quickly. However, creation of communication connections between the apparatuses and transmission of related control signals generally still require coordination operations of a same backhaul core network.

Further speaking, according to protocols used in current direct-mode communication systems, information (e.g., practical locations of the apparatuses and control signals) management and coordination between the direct-mode communication apparatuses can only be accomplished by a same backhaul core network. Therefore, when two direct-mode communication apparatuses belong to different backhaul core networks (e.g., different telecommunication operators), it is difficult for the two apparatuses to create a direct-mode communication connection therebetween according to the existing direct-mode communication protocols. This leads to inconveniences in use.

Accordingly, an urgent need exists in the art to provide a solution capable of integrating different backhaul core networks so that direct-mode communication apparatuses of the different backhaul core networks can create direct-mode communication connections therebetween successfully to improve the convenience in use of the direct-mode communication apparatuses.

SUMMARY

To address the aforesaid problem, the present invention, in certain embodiments, provides a direct-mode communication system and a communication attaching method thereof. The direct-mode communication system and the communication attaching method thereof mainly allow direct-mode communication apparatuses of different backhaul networks to create direct-mode communication connections therebetween to improve the convenience in use of the direct-mode communication system.

To achieve the aforesaid objective, certain embodiments of the present invention provide a communication attaching method for use in a direct-mode communication system. The direct-mode communication system comprises a first client direct-mode communication apparatus, a first backhaul network and a second backhaul network. The communication attaching method comprises the following steps of: (a) enabling the first client direct-mode communication apparatus to transmit a proximity notification request to the second backhaul network via the first backhaul network; (b) enabling the second backhaul network to transmit a proximity notification acknowledgement (ACK) signal to the first client direct-mode communication apparatus via the first backhaul network according to the proximity notification request; (c) enabling the first backhaul network to, after the step (b), receive a piece of first client location information and a piece of second client location information from the first client direct-mode communication apparatus and the second backhaul network respectively; (d) enabling the first backhaul network to determine a location relationship between the first client direct-mode communication apparatus and the second client direct-mode communication apparatus according to the first client location information and the second client location information; (e) enabling the first backhaul network to transmit a Wi-Fi connection signal to the first client direct-mode communication apparatus according to the location relationship; and (f) enabling the first client direct-mode communication apparatus to create a direct-mode communication connection with the second client direct-mode communication apparatus according to the Wi-Fi connection signal.

To achieve the aforesaid objective, certain embodiments of the present invention further provide a direct-mode communication system, which comprises a first client direct-mode communication apparatus, a first backhaul network and a second backhaul network. The first client direct-mode communication apparatus transmits a proximity notification request to the second backhaul network via the first backhaul network. The second backhaul network transmits a proximity notification ACK signal to the first client direct-mode communication apparatus via the first backhaul network according to the proximity notification request. The first backhaul network receives a piece of first client location information and a piece of second client location information from the first client direct-mode communication apparatus and the second backhaul network respectively. The first backhaul network determines a location relationship between the first client direct-mode communication apparatus and the second client direct-mode communication apparatus according to the first client location information and the second client location information, and transmits a Wi-Fi connection signal to the first client direct-mode communication apparatus according to the location relationship. The first client direct-mode communication apparatus creates a direct-mode communication connection with the second client direct-mode communication apparatus according to the Wi-Fi connection signal.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. However, these example embodiments are not intended to limit the present invention to any specific embodiments, examples, environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction, and dimensional relationships among the individual elements in the attached drawings are illustrated only for the ease of understanding, but not to limit the actual scale.

Figure 1A:
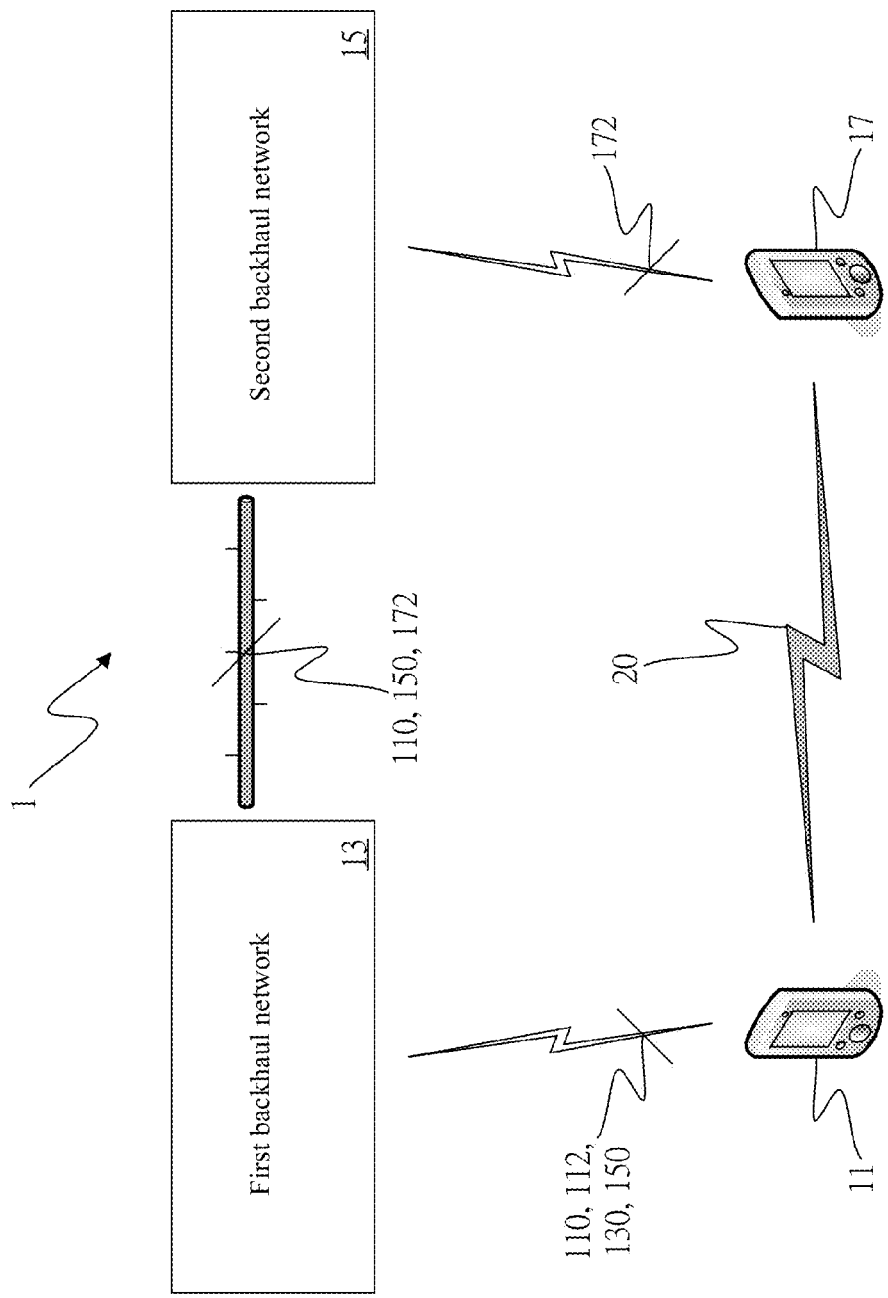
FIG. 1A is a schematic view of a direct-mode communication system according to a first embodiment of the present invention.
Figure 1B:
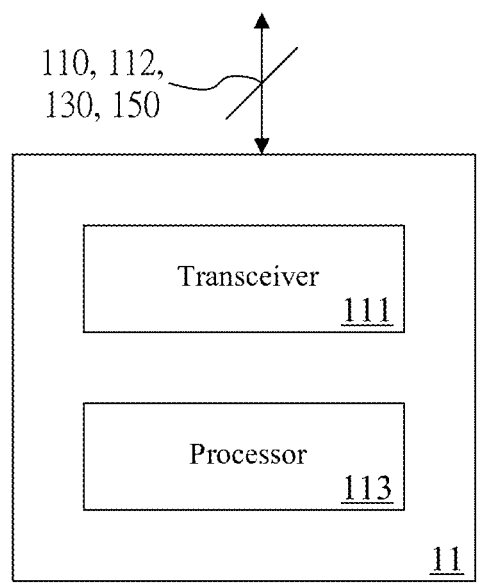
FIG. 1B is a schematic view of a first client direct-mode communication apparatus according to the first embodiment of the present invention.

Referring to FIG. 1A-1B, FIG. 1A is a schematic view of a direct-mode communication system 1 according to a first embodiment of the present invention, and FIG. 1B is a schematic view of a first client direct-mode communication apparatus 11 according to the first embodiment of the present invention. The direct-mode communication system 1 comprises a first client direct-mode communication apparatus 11, a first backhaul network 13 and a second backhaul network 15. The first client direct-mode communication apparatus 11 connects with the first backhaul network 13, the first backhaul network 13 connects with the second backhaul network 15, and the second backhaul network 15 connects with a second client direct-mode communication apparatus. The first client direct-mode communication apparatus 11 comprises a transceiver 111 and a processor 113. Interactions between individual network components will be further described hereinafter.

First, the first client direct-mode communication apparatus 11 may transmit a notification signal firstly via the first backhaul network 13 to which it belongs in order to create a communication connection with the second direct-mode communication apparatus 17 of the second backhaul network 15. In particular, the transceiver 111 of the first client direct-mode communication apparatus 11 may transmit a proximity notification request 110 to the second backhaul network 15 firstly via the first backhaul network 13 to notify the second backhaul network 15 that the first client direct-mode communication apparatus 11 is ready to create a direct-mode communication connection.

Then, the second backhaul network 15 can transmit a proximity notification acknowledgement (ACK) signal 150 back to the first client direct-mode communication apparatus 11 via the first backhaul network 13 according to the proximity notification request to acknowledge receipt of the request of the first client direct-mode communication apparatus 11. Later, the second backhaul network 15 will determine whether the second direct-mode communication apparatus 17 is in the vicinity of the first direct-mode communication apparatus 11.

Subsequently, the first backhaul network 13 and the second backhaul network 15 continuously receive a piece of first client location information 112 of the first client direct-mode communication apparatus 11 and a piece of second client location information 172 of the second client direct-mode communication apparatus 17 respectively. The location information comprises actual locations of the apparatuses. Then, the second backhaul network 15 transmits the received second client location information 172 to the first backhaul network 13 in time so that the first backhaul network 13 determines whether a communication connection can be created between the first client direct-mode communication apparatus 11 and the second direct-mode communication apparatus 17 according to the location relationship therebetween.

In other words, the first backhaul network 13 receives the first client location information 112 and the second client location information 172 from the first client direct-mode communication apparatus 11 and the second backhaul network 15 respectively to make the associated determination subsequently. If the first backhaul network 13 determines, according to the first client location information 112 and the second client location information 172, that a location relationship (not shown) between the first client direct-mode communication apparatus 11 and the second client direct-mode communication apparatus 17 allows for creation of a communication connection therebetween, the first backhaul network 13 transmits a Wi-Fi connection signal 130 to the first client direct-mode communication apparatus 11 according to the location relationship.

Finally, once the Wi-Fi connection signal 130 is received by the transceiver 111 of the first client direct-mode communication apparatus 11, the first client direct-mode communication apparatus 11 can create a communication connection with the second client direct-mode communication apparatus 17 of the second backhaul network 15. Accordingly, the processor 113 of the first client direct-mode communication apparatus 11 can create a direct-mode communication connection 20 with the second client direct-mode communication apparatus 17 according to the Wi-Fi connection signal 130, so that the two client direct-mode communication apparatuses exchange data with each other subsequently.

It should be appreciated that, in this embodiment, the first client direct-mode communication apparatus 11 is a direct-mode communication apparatus that directly belongs to the first backhaul network 13. However, in other implementations, before the connection of the first client direct-mode communication apparatus 11 with the first backhaul network 13 is acknowledged (i.e., when the first client direct-mode communication apparatus 11 does not belong to the first backhaul network 13 yet), the first client direct-mode communication apparatus 11 can mainly use the processor 133 to register with the first backhaul network 13 via the transceiver 131 so that subsequent operations can be further performed.

Figure 2A:
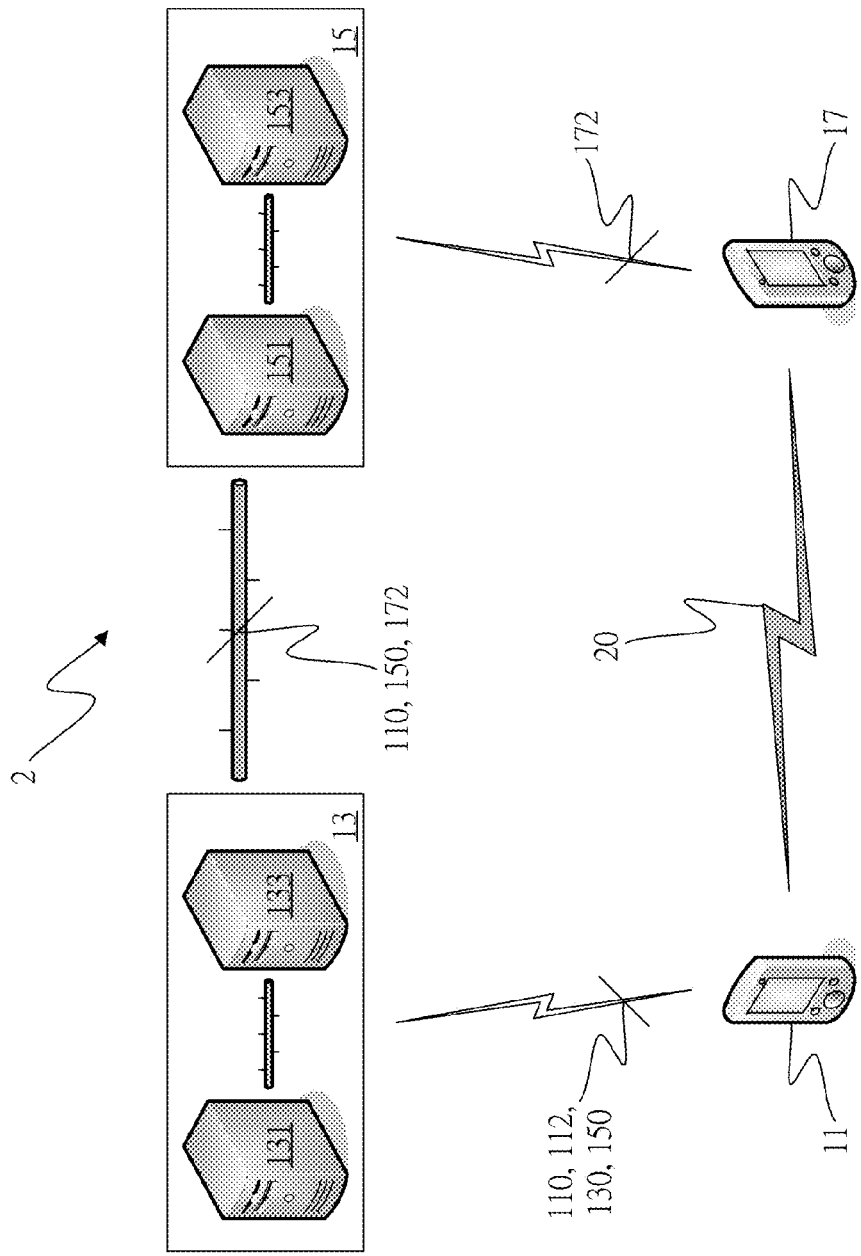
FIG. 2A is a schematic view of a direct-mode communication system according to a second embodiment of the present invention.

Referring to FIG. 2A, it is a schematic view of a direct-mode communication system 2 according to a second embodiment of the present invention. It should be appreciated that, the system architecture and the network connection environment in the second embodiment are the same as those in the previous embodiment, so elements with the same reference numerals also have the same functions and will not be described again herein. However, the second embodiment is different from the previous embodiment in that, the first backhaul network 13 further comprises a Proximity Services (ProSe) server 131 and a Gateway Mobile Location Center (GMLC) server 133 and the second backhaul network 15 also comprises a ProSe server 151 and a GMLC server 153 in the second embodiment.

It should be emphasized that, the ProSe server is a server that mainly provides proximity-based services and controls related signals, and is used to accomplish the following services: application enablement, network communication selection, network security, lawful interception, proximity-based service discovery, direct proximity-based service communication, interworking between device discovery and service discovery, and so on. The contents of these services provided by the ProSe server can be appreciated by people skilled in the art and, thus, will not be further described herein.

In particular, when the first client direct-mode communication apparatus 11 desires to create a communication connection with the second direct-mode communication apparatus 17 of the second backhaul network 15, the transceiver 111 of the first client direct-mode communication apparatus 11 may also transmit a proximity notification request 110 to the second backhaul network 15 firstly via the first backhaul network 13 to notify the second backhaul network 15 that the first client direct-mode communication apparatus 11 is ready to create a direct-mode communication connection.

Then, the ProSe server 151 of the second backhaul network 15 firstly determines whether the connection between the first client direct-mode communication apparatus 11 and the second client direct-mode communication apparatus 17 is legal according to the proximity notification request 110 of the first client direct-mode communication apparatus 11 (e.g., determines whether the first client direct-mode communication apparatus 11 is listed in a list of apparatuses that can communicate with the second client direct-mode communication apparatus 17 according to related information of the second client direct-mode communication apparatus 17 stored in the second backhaul network 15). If it is legal, the second backhaul network 15 returns a proximity notification ACK signal 150 to the first client direct-mode communication apparatus 11 via the first backhaul network 13.

Subsequently, from the perspective of the first backhaul network 13, it receives and updates the first client location information 112 of the first client direct-mode communication apparatus 11 continuously by using the GMLC server 133. On the other hand, from the perspective of the second backhaul network 15, it receives and updates the second client location information 172 of the second client direct-mode communication apparatus 17 continuously by using the GMLC server 153.

Then, the ProSe server 131 of the first backhaul network 13 can firstly receive and update the second client location information 172 dynamically from the ProSe server 151 of the second backhaul network 15. The ProSe server 131 of the first backhaul network 13 then further determines a location relationship between the first client direct-mode communication apparatus 11 and the second client direct-mode communication apparatus 17 according to the first client location information 112 and the second client location information 172.

Likewise, if the ProSe server 131 of the first backhaul network 13 determines that the location relationship between the first client direct-mode communication apparatus 11 and the second client direct-mode communication apparatus 17 allows for creation of a communication connection therebetween according to the first client location information 112 and the second client location information 172, the ProSe server 131 of the first backhaul network 13 transmits a Wi-Fi connection signal 130 to the first client direct-mode communication apparatus 11 according to the location relationship so that the first client direct-mode communication apparatus 11 creates the direct-mode communication connection 20 with the second client direct-mode communication apparatus 17 according to the Wi-Fi connection signal 130. Then, the two client direct-mode communication apparatuses can exchange data with each other.

Figure 2B:
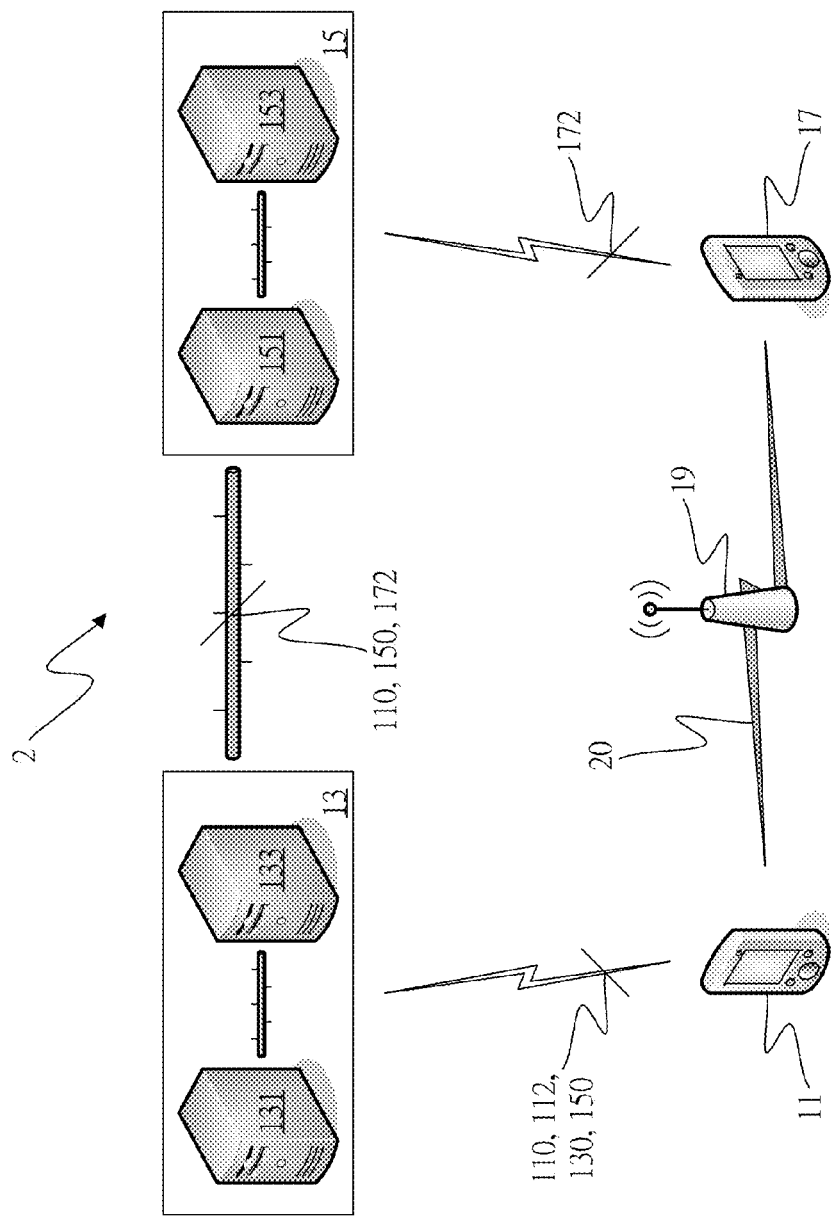
FIG. 2B is a schematic view of another direct-mode communication system according to the second embodiment of the present invention.

Referring to FIG. 2B, it is a schematic view of another implementation of the direct-mode communication system 2 according to the second embodiment of the present invention. In detail, the first client direct-mode communication apparatus 11 can connect with the second client direct-mode communication apparatus 17 in the previous implementation. For example, when the first client direct-mode communication apparatus 11 and the second client direct-mode communication apparatus 17 are both Wi-Fi apparatuses, the two client direct-mode communication apparatuses can create a Wi-Fi direct-mode communication connection therebetween directly or by using each other as a hot spot. However, in other implementations, the first client direct-mode communication apparatus 11 and the second client direct-mode communication apparatus 17 may also create a direct-mode communication connection 20 therebetween via a relay station 19 (e.g., a wireless network access point of a Wi-Fi network) when the two client direct-mode communication apparatuses are allowed to create a communication connection therebetween but beyond each other's communication distance.

Figure 3:
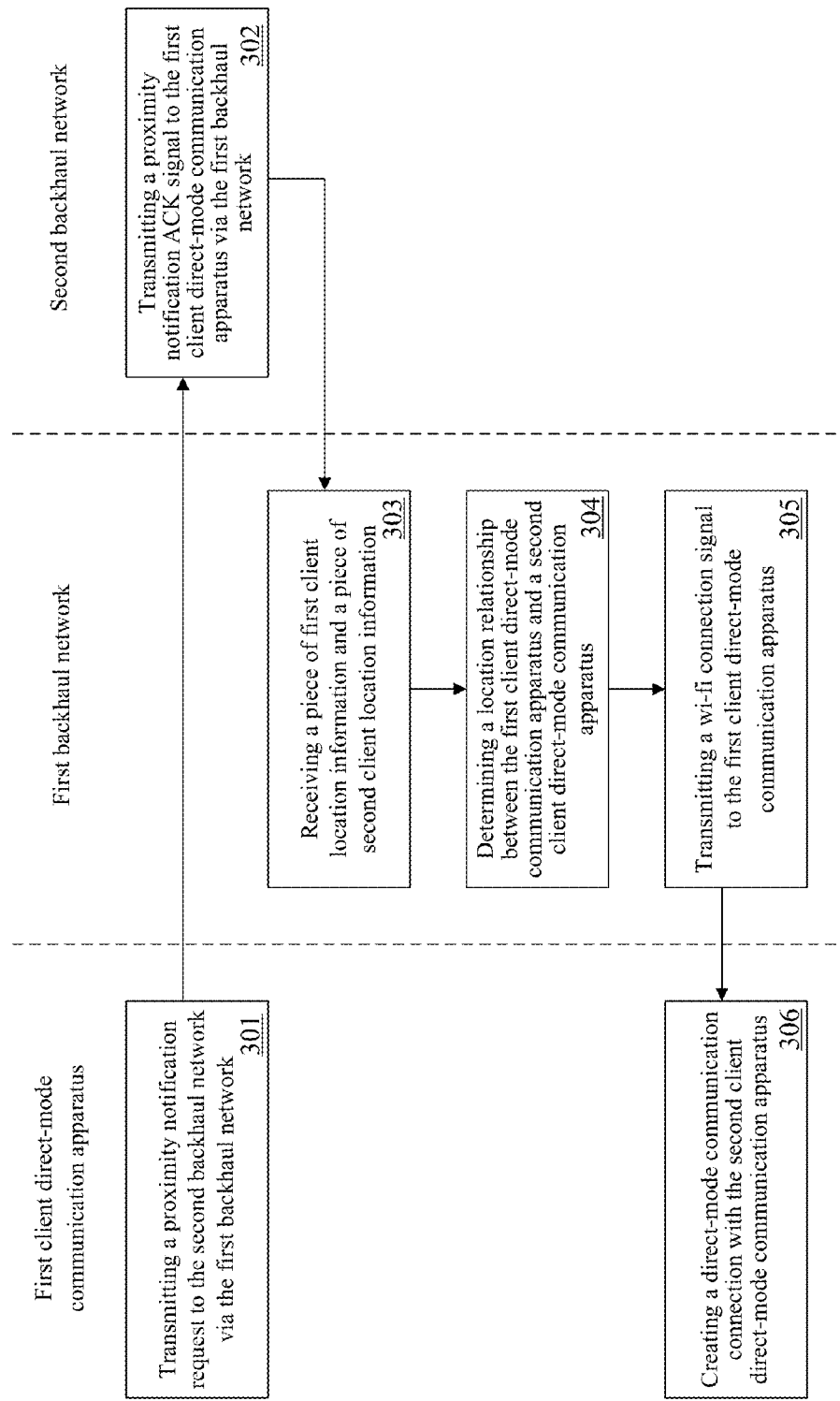
FIG. 3 is a flowchart diagram of a communication attaching method according to a third embodiment of the present invention.

A third embodiment of the present invention is a communication attaching method, a flowchart diagram of which is shown in FIG. 3. The method of the third embodiment is for use in a direct-mode communication system (e.g., the direct-mode communication system 1 of the aforesaid embodiment) as well as a first client direct-mode communication apparatus, a first backhaul network and a second backhaul network (e.g., the first client direct-mode communication apparatus 11, the first backhaul network 13 and the second backhaul network 15 of the aforesaid embodiments) comprised in the direct-mode communication system. The detailed steps of the third embodiment are as follows.

Firstly, step 301 is executed to enable the first client direct-mode communication apparatus to transmit a proximity notification request to the second backhaul network via the first backhaul network. Then, step 302 is executed to enable the second backhaul network to transmit a proximity notification ACK signal to the first client direct-mode communication apparatus via the first backhaul network according to the proximity notification request. Next, step 303 is executed to enable the first backhaul network to receive a piece of first client location information of the first client direct-mode communication apparatus and a piece of second client location information of the second client direct-mode communication apparatus from the first client direct-mode communication apparatus and the second backhaul network respectively.

Subsequently, step 304 is executed to enable the first backhaul network to determine a location relationship between the first client direct-mode communication apparatus and the second client direct-mode communication apparatus according to the first client location information and the second client location information. Then, step 305 is executed to enable the first backhaul network to transmit a Wi-Fi connection signal to the first client direct-mode communication apparatus according to the location relationship. Finally, step 306 is executed to enable the first client direct-mode communication apparatus to create a direct-mode communication connection with the second client direct-mode communication apparatus according to the Wi-Fi connection signal.

It should also be appreciated that, in the third embodiment, the first client direct-mode communication apparatus is also a direct-mode communication apparatus that directly belongs to the first backhaul network. However, in other implementations, before the connection of the first client direct-mode communication apparatus with the first backhaul network is acknowledged, the first client direct-mode communication apparatus 11 can also register with the first backhaul network firstly so that subsequent operations can be performed.

Figure 4:
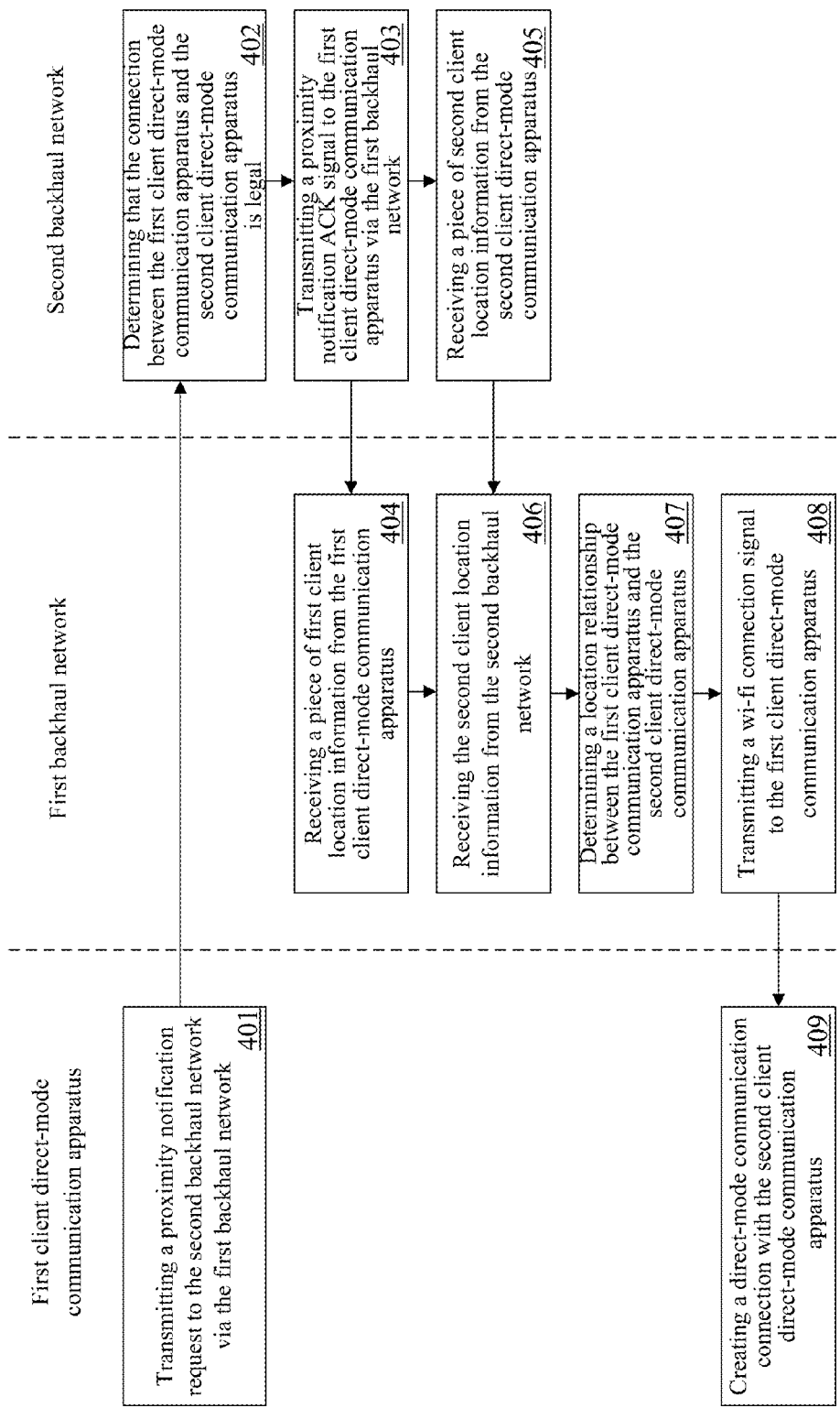
FIG. 4 is a flowchart diagram of a communication attaching method according to a fourth embodiment of the present invention.

A fourth embodiment of the present invention is a communication attaching method, a flowchart diagram of which is shown in FIG. 4. The method of the fourth embodiment is for use in a direct-mode communication system (e.g., the direct-mode communication system 2 of the aforesaid embodiment) as well as a first client direct-mode communication apparatus, a first backhaul network and a second backhaul network (e.g., the first client direct-mode communication apparatus 11, the first backhaul network 13 and the second backhaul network 15 of the aforesaid embodiments) comprised in the direct-mode communication system. Likewise, the first backhaul network comprises a ProSe server and a GMLC server and the second backhaul network comprises a ProSe server and a GMLC server. The detailed steps of the fourth embodiment are as follows.

Firstly, step 401 is executed to enable the first client direct-mode communication apparatus to transmit a proximity notification request to the second backhaul network via the first backhaul network. Then, step 402 is executed to enable the ProSe server of the second backhaul network to determine that the connection between the first client direct-mode communication apparatus and a second client direct-mode communication apparatus is legal according to the proximity notification request. Next, step 403 is executed to enable the ProSe server of the second backhaul network to transmit a proximity notification ACK signal to the first client direct-mode communication apparatus via the first backhaul network.

Subsequently, step 404 is executed to enable the GMLC server of the first backhaul network to receive a piece of first client location information from the first client direct-mode communication apparatus. Then, step 405 is executed to enable the GMLC server of the second backhaul network to receive a piece of second client location information from the second client direct-mode communication apparatus. It should be appreciated that, the order of step 404 and step 405 can be exchanged or step 404 and step 405 can be executed simultaneously as long as the different backhaul networks can receive location information of different apparatuses respectively.

Then, step 406 is executed to enable the ProSe server of the first backhaul network to receive the second client location information from the ProSe server of the second backhaul network. Next, step 407 is executed to enable the ProSe server of the first backhaul network to determine a location relationship between the first client direct-mode communication apparatus and the second client direct-mode communication apparatus according to the first client location information and the second client location information. Then, step 408 is executed to enable the first backhaul network to transmit a Wi-Fi connection signal to the first client direct-mode communication apparatus according to the location relationship. Finally, step 409 is executed to enable the first client direct-mode communication apparatus to create a direct-mode communication connection with the second client direct-mode communication apparatus according to the Wi-Fi connection signal.

According to the above descriptions, the direct-mode communication system and the communication attaching method thereof according to the present invention can integrate different backhaul core networks so that direct-mode communication apparatuses of the different backhaul core networks can create direct-mode communication connections therebetween successfully to improve the convenience in use of the direct-mode communication apparatuses.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A communication attaching method for use in a direct-mode communication system, the direct-mode communication system comprising a first client direct-mode communication apparatus and a first backhaul network, the first backhaul network comprising a first Proximity Services (ProSe) server, and the first ProSe server of the first backhaul network connecting with a second ProSe server of the second backhaul network that connects with a second client direct-mode communication apparatus, the communication attaching method comprising the following steps of:

(a) enabling the first client direct-mode communication apparatus to transmit a proximity notification request to the second ProSe server of the second backhaul network via the first backhaul network so that the second ProSe server of the second backhaul network transmits a proximity notification acknowledgement (ACK) signal to the first client direct-mode communication apparatus via the first backhaul network according to the proximity notification request;

(b1) enabling the first ProSe server of the first backhaul network to, after the step (a), receive the first client location information from the first client direct-mode communication apparatus;

(b2) enabling the first ProSe server of the first backhaul network to receive the second client location information from the second backhaul network;

(c) enabling the first ProSe server of the first backhaul network to determine a location relationship between the first client direct-mode communication apparatus and the second client direct-mode communication apparatus according to the first client location information and the second client location information;

(d) enabling the first ProSe server of the first backhaul network to transmit a Wi-Fi connection signal to the first client direct-mode communication apparatus according to the location relationship; and (e) enabling the first client direct-mode communication apparatus to create a direct-mode communication connection with the second client direct-mode communication apparatus according to the Wi-Fi connection signal.

2. The communication attaching method as claimed in claim 1, further comprising the following step before the step (a):

(a1) enabling the first client direct-mode communication apparatus to register with the first ProSe server of the first backhaul network.

3. The communication attaching method as claimed in claim 1, wherein the first backhaul network further comprises a Gateway Mobile Location Center (GMLC) server, and the step (b1) further comprises the following step of:
  (b1i) enabling the first ProSe server of the first backhaul network to, after the step (a), receive the first client location information from the first client direct-mode communication apparatus by using the GMLC server of the first backhaul network.

4. The communication attaching method as claimed in claim 1, wherein the step (e) further comprises the following step of:
  (e1) enabling the first client direct-mode communication apparatus to create the direct-mode communication connection with the second client direct-mode communication apparatus via a relay station according to the Wi-Fi connection signal, wherein the relay station connects with the first backhaul network and the second backhaul network simultaneously.

5. A direct-mode communication system, comprising:
  a first client direct-mode communication apparatus; and
  a first backhaul network, connecting with a second backhaul network that connects with a second client direct-mode communication apparatus, wherein the first backhaul network comprises a first Proximity Services (ProSe) server;
  wherein the first client direct-mode communication apparatus transmits a proximity notification request to a second ProSe server of the second backhaul network via the first backhaul network so that the second ProSe server of the second backhaul network transmits a proximity notification ACK signal to the first client direct-mode communication apparatus via the first backhaul network according to the proximity notification request; the first ProSe server of first backhaul network receives a piece of first client location information of the first client direct-mode communication apparatus from the first client direct-mode communication apparatus, the first ProSe server of the first backhaul network receives a piece of second client location information of the second client direct-mode communication apparatus from the second backhaul network; the first ProSe server of the first backhaul network further determines a location relationship between the first client direct-mode communication apparatus and the second client direct-mode communication apparatus according to the first client location information and the second client location information, and transmits a Wi-Fi connection signal to the first client direct-mode communication apparatus according to the location relationship; and the first client direct-mode communication apparatus further creates a direct-mode communication connection with the second client direct-mode communication apparatus according to the Wi-Fi connection signal.

6. The direct-mode communication system as claimed in claim 5, wherein the first client direct-mode communication apparatus further registers with the first ProSe server of the first backhaul network.

7. The direct-mode communication system as claimed in claim 5, wherein the first backhaul network further comprises:
  a Gateway Mobile Location Center (GMLC) server;
  wherein the first ProSe server of the first backhaul network receives the first client location information from the first client direct-mode communication apparatus by using the GMLC server of the first backhaul network.

8. The direct-mode communication system as claimed in claim 5, wherein the first client direct-mode communication apparatus creates the direct-mode communication connection with the second client direct-mode communication apparatus via a relay station according to the Wi-Fi connection signal, and the relay station connects with the first backhaul network and the second backhaul network simultaneously.

9. A communication attaching method for use in a direct-mode communication system, the direct-mode communication system comprising a first client direct-mode communication apparatus, a first backhaul network and a second backhaul network, the first backhaul network comprising a first Proximity Services (ProSe) server, the second backhaul network comprising a second ProSe server and connecting with a second client direct-mode communication apparatus, the communication attaching method comprising:
  (a) enabling the first client direct-mode communication apparatus to transmit a proximity notification request to the second ProSe server of the second backhaul network via the first backhaul network;
  (b) enabling the second ProSe server of the second backhaul network to transmit a proximity notification ACK signal to the first client direct-mode communication apparatus via the first backhaul network according to the proximity notification request;
  (c) enabling the first ProSe server of the first backhaul network to, after the step (b), receive a piece of first client location information of the first client direct-mode communication apparatus and a piece of second client location information of the second client direct-mode communication apparatus from the first client direct-mode communication apparatus and the second backhaul network respectively;
  (d) enabling the first ProSe server of the first backhaul network to determine a location relationship between the first client direct-mode communication apparatus and the second client direct-mode communication apparatus according to the first client location information and the second client location information;
  (e) enabling the first ProSe server of the first backhaul network to transmit a Wi-Fi connection signal to the first client direct-mode communication apparatus according to the location relationship; and
  (f) enabling the first client direct-mode communication apparatus to create a direct-mode communication connection with the second client direct-mode communication apparatus according to the Wi-Fi connection signal.

10. The communication attaching method as claimed in claim 9, wherein the step (b) further comprises:
  (b1) enabling the second ProSe server of the second backhaul network to determine that the connection between the first client direct-mode communication apparatus and the second client direct-mode communication apparatus is legal according to the proximity notification request; and
  (b2) enabling the second ProSe server of the second backhaul network to transmit the proximity notification ACK signal to the first client direct-mode communication apparatus via the first backhaul network according to the determination result of the step (b1).

11. The communication attaching method as claimed in claim 9, wherein the second backhaul network further comprises a GMLC server, the communication attaching method further comprising the following step before the step (c):
  (c1) enabling the second ProSe server of the second backhaul network to receive the second client location information from the second client direct-mode communication apparatus by using the GMLC server of the second backhaul network.

12. A direct-mode communication system, comprising:
a first client direct-mode communication apparatus;
a first backhaul network, comprising a first Proximity Services (ProSe) server; and
a second backhaul network, comprising a second ProSe server and connecting with a second client direct-mode communication apparatus;
wherein the first client direct-mode communication apparatus transmits a proximity notification request to the second ProSe server of the second backhaul network via the first backhaul network; the second ProSe server of the second backhaul network transmits a proximity notification ACK signal to the first client direct-mode communication apparatus via the first backhaul network according to the proximity notification request; the first ProSe server of the first backhaul network receives a piece of first client location information of the first client direct-mode communication apparatus and a piece of second client location information of the second client direct-mode communication apparatus from the first client direct-mode communication apparatus and the second backhaul network respectively; the first ProSe server of the first backhaul network further determines a location relationship between the first client direct-mode communication apparatus and the second client direct-mode communication apparatus according to the first client location information and the second client location information, and transmits a Wi-Fi connection signal to the first client direct-mode communication apparatus according to the location relationship; and the first client direct-mode communication apparatus further creates a direct-mode communication connection with the second client direct-mode communication apparatus according to the Wi-Fi connection signal.

13. The direct-mode communication system as claimed in claim 12,
wherein the second ProSe server of the second backhaul network further determines that the connection between the first client direct-mode communication apparatus and the second client direct-mode communication apparatus is legal according to the proximity notification request, and transmits the proximity notification ACK signal to the first client direct-mode communication apparatus via the first backhaul network.

14. The direct-mode communication system as claimed in claim 12, wherein the second backhaul network further comprises:
a GMLC server;
wherein the second ProSe server of the second backhaul network receives the second client location information from the second client direct-mode communication apparatus by using the GMLC server of the second backhaul network.

15. A communication attaching method for use in a first client direct-mode communication apparatus, the first client direct-mode communication apparatus being used in a direct-mode communication system that further comprises a first backhaul network, and the first backhaul network comprising a first Proximity Services (ProSe) server which connects with a second ProSe server of a second backhaul network and receives a piece of second client location information of a second client direct-mode communication apparatus via the second backhaul network, the communication attaching method comprising the following steps of:
(a) enabling the first client direct-mode communication apparatus to transmit a proximity notification request to the second ProSe server of the second backhaul network via the first backhaul network so that the second ProSe server of the second backhaul network transmits a proximity notification ACK signal to the first client direct-mode communication apparatus via the first backhaul network according to the proximity notification request;
(b) enabling the first client direct-mode communication apparatus to, after the step (a), transmit a piece of first client location information to the first ProSe server of the first backhaul network so that the first ProSe server of the first backhaul network determines a location relationship between the first client direct-mode communication apparatus and the second client direct-mode communication apparatus according to the first client location information and the second client location information and transmits a Wi-Fi connection signal to the first client direct-mode communication apparatus according to the location relationship; and
(c) enabling the first client direct-mode communication apparatus to create a direct-mode communication connection with the second client direct-mode communication apparatus according to the Wi-Fi connection signal.

16. The communication attaching method as claimed in claim 15, further comprising the following step before the step (a):
(a1) enabling the first client direct-mode communication apparatus to register with the first ProSe server of the first backhaul network.

17. The communication attaching method as claimed in claim 15, wherein the step (c) further comprises the following step of:
(c1) enabling the first client direct-mode communication apparatus to create the direct-mode communication connection with the second client direct-mode communication apparatus via a relay station according to the Wi-Fi connection signal, wherein the relay station connects with the first backhaul network and the second backhaul network simultaneously.

18. A first client direct-mode communication apparatus for use in a direct-mode communication system, the direct-mode communication system further comprising a first backhaul network, and the first backhaul network comprising a first Proximity Services (ProSe) server which connects with a second ProSe server of a second backhaul network and receives a piece of second client location information of a second client direct-mode communication apparatus via the second backhaul network, the first client direct-mode communication apparatus comprising:
a transceiver; and
a processor;
wherein the transceiver is configured to transmit a proximity notification request to the second ProSe server of the second backhaul network via the first backhaul network so that the second ProSe server of the second backhaul network transmits a proximity notification ACK signal to the first client direct-mode communication apparatus via the first backhaul network according to the proximity notification request; the transceiver is further configured to transmit a piece of first client location information of the first client direct-mode communication apparatus to the first ProSe server of the first backhaul network so that the first ProSe server of the first backhaul network determines a location relationship between the first client direct-mode communication apparatus and the second client direct-mode communication apparatus according to the first client location information and the second client location information and transmits a Wi-Fi connection signal to the first client direct-mode communication apparatus according to the location relationship; and the processor is configured to create a direct-mode communication connection with the second client direct-mode communication apparatus via the transceiver according to the Wi-Fi connection signal.

19. The first client direct-mode communication apparatus as claimed in claim 18, wherein the processor is further configured to register with the first ProSe server of the first backhaul network via the transceiver.

20. The first client direct-mode communication apparatus as claimed in claim 18, wherein the processor creates the direct-mode communication connection with the second client direct-mode communication apparatus via a relay station and through use of the transceiver according to the Wi-Fi connection signal, wherein the relay station connects with the first backhaul network and the second backhaul network simultaneously.

* * * * *